(No Model.) 2 Sheets—Sheet 1.
A. S. HEATH & O. V. METTS.
PLANTER AND FERTILIZER DISTRIBUTER.
No. 456,412. Patented July 21, 1891.
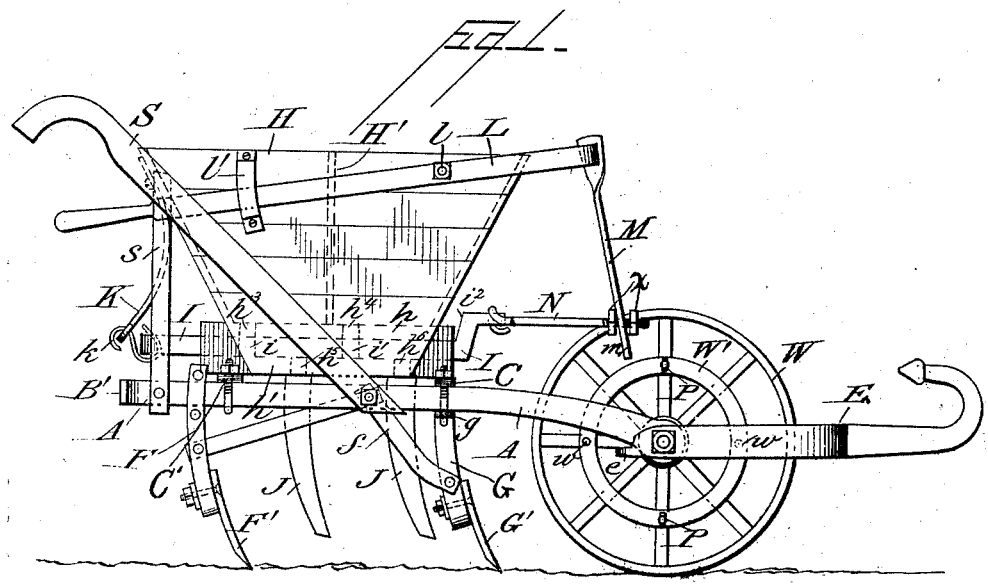
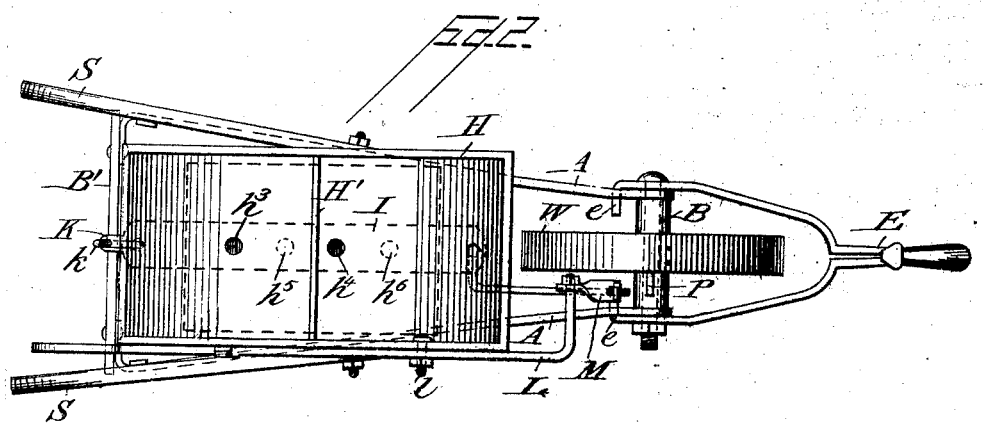

(No Model.) 2 Sheets—Sheet 2.
A. S. HEATH & O. V. METTS.
PLANTER AND FERTILIZER DISTRIBUTER.
No. 456,412. Patented July 21, 1891.
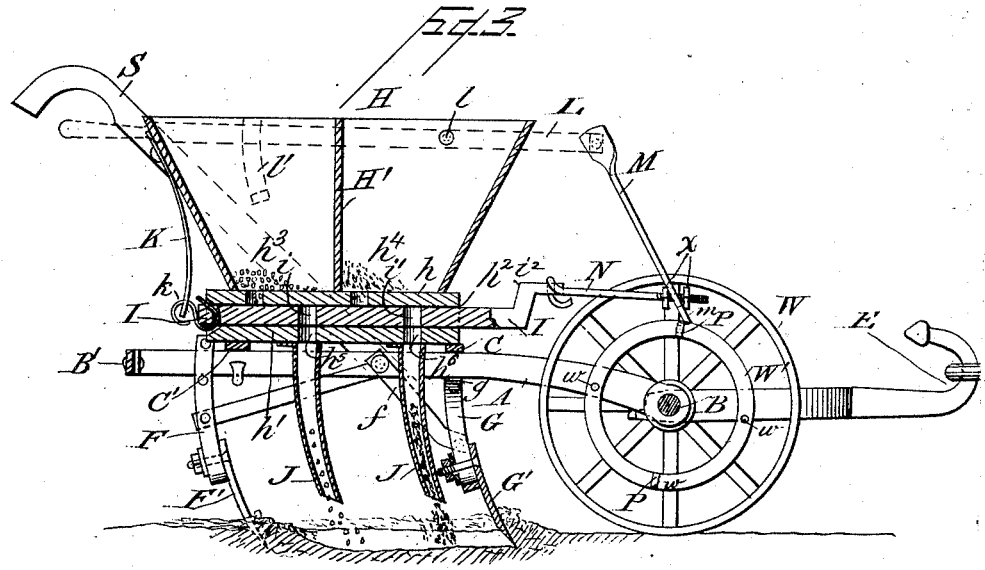
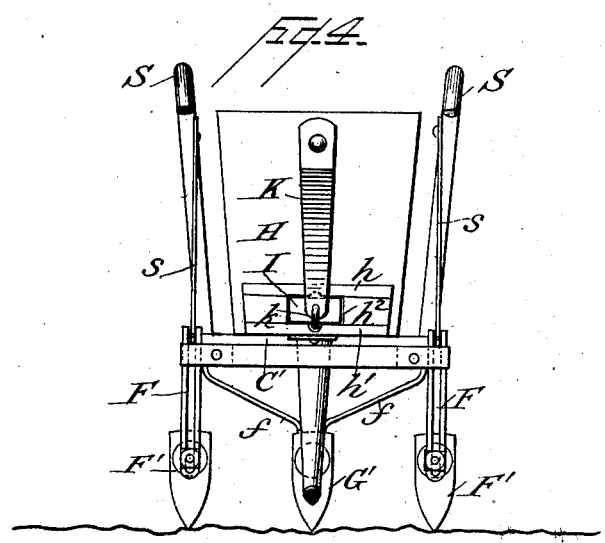
Attest:
H. H. Schott
M. H. Chandler
Inventor
Augustus S. Heath &
Oliver V. Metts
by M. T. E. Chandler & Co.
attys

UNITED STATES PATENT OFFICE.

AUGUSTUS SMITH HEATH AND OLIVER V. METTS, OF MACON, GEORGIA.

PLANTER AND FERTILIZER-DISTRIBUTER.

SPECIFICATION forming part of Letters Patent No. 456,412, dated July 21, 1891.

Application filed February 6, 1891. Serial No. 380,476. (No model.)

*To all whom it may concern:*

Be it known that we, AUGUSTUS SMITH HEATH and OLIVER V. METTS, citizens of the United States, residing at Macon, in the county of Bibb, State of Georgia, have invented certain new and useful Improvements in Planters and Fertilizer-Distributers; and we declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in a combined planter and fertilizer-distributer, and has for its object the construction of the delivery mechanism and means for operating the same, whereby the seed and fertilizer are intermittently and regularly deposited.

The invention consists of a supporting-frame, which has a traction-wheel journaled in its forward end and cultivator-teeth attached to the under side of its rear end, of a double hopper carried by the frame and provided with a double bottom forming a chamber, in which is carried a reciprocating slide provided with a recess adapted to register alternately with openings in the upper wall of the chamber and similar openings in the lower wall of the same to intermittently deposit the seed and fertilizer contained in the hopper, the spouts leading from the hopper and having their mouths in such a position as to drop the seed and fertilizer in a furrow formed by the front tooth of the cultivator and be covered by the rear teeth, and the mechanism for operating the said slide, consisting of a spring, the peculiarly-constructed traction-wheel, and the intermediate connections.

The invention further consists of the novel construction, combination, and arrangement of parts, as will be hereinafter more fully described, pointed out in the appended claim, and illustrated in the accompanying drawings.

In the accompanying drawings, in which similar letters of reference designate corresponding parts, Figure 1 is a side elevation of a device embodying the invention. Fig. 2 is a plan view. Fig. 3 is a longitudinal vertical section. Fig. 4 is a rear elevation. Fig. 5 is a perspective view of the slide.

In the drawings, A A represent the longitudinal bars, which, together with the transverse bars B B', connecting their ends, and the transverse intermediate bars C C', form the supporting-frame of the machine. These bars are preferably formed of flat pieces of metal cut and bent to the desired shape and joined together in any suitable manner.

On the front cross-bar B is journaled the carrying-wheel, of peculiar construction, which will be described later on. The ends of the front cross-bar B are extended beyond the longitudinal bars and have secured thereon the bifurcated end of the hook E. The ends of the bifurcation are extended beyond their points of attachment and are bent inwardly, forming the lugs $e\ e$, which serve to support the hook in such a way as to prevent it from dropping below a horizontal position.

To the rear end of the longitudinal bars A A are secured the standards F F, to the lower ends of which are adjustably secured the plows F' F'. To the central part of the longitudinal bars, beneath the intermediate cross-bar C, is secured the standard G, the lower part of which has a construction similar to that of the standard F. The upper ends of the sides $g\ g$ of the standard are spread apart at the top and the end of each secured to the longitudinal bar on its respective side. To this standard is secured the plow G'. Braces $f\ f$ extend from the longitudinal bars to the standards and serve to steady and keep them in their relative positions.

S S represent handles secured at their lower ends to the longitudinal bars immediately back of the intermediate cross-bar C, and extend upward and backward in the ordinary manner.

$s\ s$ are braces extending from the rear ends of the longitudinal bars to the handle.

On the intermediate cross-bars C C' is secured the hopper H, which is divided into two compartments by the partition H', and which is provided with a double bottom consisting of upper and lower walls $h$ and $h'$, respectively forming between them the chamber $h^2$, open at its front and rear ends. In the upper wall of this chamber are the openings $h^3$ and $h^4$, opening, respectively, into the rear parts of the two compartments. In the lower wall are the openings $h^5$ and $h^6$, respectively situated in front of the openings $h^3$ and $h^4$.

In the chamber $h^2$ is carried the reciprocating slide I, having its ends projecting through the openings in the ends of the chamber. In this slide are formed the recesses $i$ and $i'$, of the same diameter as the openings into the said chamber $h^2$. The distance between the openings $h^3$ and $h^4$ and $h^5$ and $h^6$ in the walls of the chamber and the recesses in the slide are respectively equal. It will be observed that the slide has considerable thickness, so that the recesses $i$ and $i'$ will have sufficient depth to carry the necessary amount of seed and fertilizer to be deposited at each dropping.

Leading from the openings in the bottom of the chamber $h^2$ to a suitable place to deposit the seed and fertilizer are the spouts J.

To the rear side of the hopper is secured the flat spring K, having its lower end curved outward and attached by the S-hook $k$ to the projecting end of the slide. Normally the spring K will tend to cause the recesses $i$ and $i'$ of the slide to register, respectively, with the openings $h^3$ and $h^4$ of the chamber $h^2$. The front end of the slide, which projects beyond the chamber $h^2$, is bent upward and outward, forming a shoulder $i^2$, which prevents the spring K from drawing the slide too far backward, so that the recesses in the slide will pass the openings in the top of the chamber.

L represents a lever pivoted at $l$ to the side of the hopper and having its rear end or handle in close proximity to one of the handles S, so as to be easily grasped by the operator. A band or guide-loop $l'$ limits the play of the lever. The front end of the lever extends beyond the hopper a short distance and is bent inwardly, and has journaled on its end the upper end of the pendent arm M. The lower end of this arm is secured to the front end of the slide I by the link N. The configuration of the link is such as will enable it to pass the wheel W without coming in contact with the same, and its front end is adjustably secured to the lower end of the arm by means of the nuts $x\,x$. The main part of the wheel W is of any suitable construction adapted to the purpose.

W' is a circular band secured to the spokes concentric with the periphery of the wheel, and is provided at intervals with holes or sockets $w$, in which can be removably seated the pins P. When the wheel is rotated, these pins will engage with the extended end $m$ of the pendent arm M, and by means of the same and the connecting-link N draw forward intermittently the slide I, so that the recesses $i$ and $i'$ will register, respectively, with the openings $h^5$ and $h^6$.

The operation of the device is as follows: The hopper is filled with seed and fertilizer which it is desired to distribute, and the operator grasps the handles S S and governs the action of the cultivator-teeth in the ordinary well-known manner. When he desires to have the seed and fertilizer deposited, he elevates the rear end of the lever L, which will depress the pendent arm M, so that the pins P will engage with the lower end of the said arm and force it forward, and through the connecting-link N carry the slide forward so that the recesses $i$ and $i'$ will register with the openings $h^5$ and $h^6$ and allow the seed and fertilizer, which have filled into the recesses in the slide through the openings in the top of the chamber, to fall into the spouts and be carried into the furrow made by the first plow and be covered by the two rear ones. The frequency with which the slide moves can be regulated by the number of pins in the circular band. It is obvious that when the operator desires to stop the outflow of the seed and fertilizer he depresses the lever L.

Having thus described our invention, what we claim, and desire to secure by Letters Patent, is—

In a device of the class described, the combination of the hopper having a chamber formed in its lower part opening into the hopper and beneath the same, the perforated slide I, carried within the said chamber and having a raised portion $i^2$ to form a stop to limit the backward play of the slide, the spring K, attached to the rear side of the hopper and connected with the rear end of the slide, the lever L, pivoted to the side of the hopper and having its forward end bent inwardly, the pendent arm M, journaled at its upper end on the inwardly-turned end of the lever and having the extension $m$ at its lower end, the link N, adjustably connecting the said arm with the front end of the slide, and the traction-wheel provided with pins P, adapted to successively engage with the extension $m$ of the pendent arm, substantially as described.

In testimony whereof we affix our signatures in presence of two witnesses.

AUGUSTUS SMITH HEATH.
OLIVER V. METTS.

Witnesses:
J. F. MEANS,
B. Z. CHAMBLISS.